United States Patent
McCall et al.

(10) Patent No.: US 8,039,682 B2
(45) Date of Patent: Oct. 18, 2011

(54) PRODUCTION OF AVIATION FUEL FROM RENEWABLE FEEDSTOCKS

(75) Inventors: Michael J. McCall, Geneva, IL (US); Joseph A. Kocal, Glenview, IL (US); Alakananda Bhattacharyya, Glen Ellyn, IL (US); Tom N. Kalnes, LaGrange, IL (US); Timothy A. Brandvold, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 239 days.

(21) Appl. No.: 12/402,078

(22) Filed: Mar. 11, 2009

(65) Prior Publication Data
US 2009/0283442 A1 Nov. 19, 2009

Related U.S. Application Data

(60) Provisional application No. 61/037,066, filed on Mar. 17, 2008.

(51) Int. Cl.
*C10G 1/00* (2006.01)
(52) U.S. Cl. .................. 585/240; 585/242; 585/800
(58) Field of Classification Search .............. 585/1, 2, 585/13, 14, 240, 242, 252, 253, 800
See application file for complete search history.

(56) References Cited

U.S. PATENT DOCUMENTS

| | | | |
|---|---|---|---|
| 5,186,722 A | 2/1993 | Cantrell et al. | |
| 5,578,090 A * | 11/1996 | Bradin | 44/308 |
| 5,705,722 A | 1/1998 | Monnier et al. | |
| 6,080,211 A | 6/2000 | Mathur | |
| 7,232,935 B2 * | 6/2007 | Jakkula et al. | 585/240 |
| 7,279,018 B2 | 10/2007 | Jakkula et al. | |
| 7,425,657 B1 | 9/2008 | Elliott et al. | |
| 7,459,597 B2 | 12/2008 | Koivusalmi et al. | |
| 7,491,858 B2 * | 2/2009 | Murzin et al. | 585/240 |
| 7,501,546 B2 | 3/2009 | Koivusalmi et al. | |
| 7,540,952 B2 | 6/2009 | Pinho et al. | |
| 7,626,063 B2 * | 12/2009 | Ghonasgi et al. | 585/276 |
| 7,816,570 B2 * | 10/2010 | Roberts et al. | 585/240 |
| 2005/0268530 A1 | 12/2005 | Brewer et al. | |
| 2006/0186020 A1 | 8/2006 | Gomes | |
| 2006/0207166 A1 | 9/2006 | Herskowitz et al. | |
| 2006/0229222 A1 | 10/2006 | Muller et al. | |
| 2006/0264684 A1 * | 11/2006 | Petri et al. | 585/250 |
| 2007/0006523 A1 | 1/2007 | Myllyoja et al. | |
| 2007/0010682 A1 | 1/2007 | Myllyoja et al. | |
| 2007/0068848 A1 | 3/2007 | Monnier et al. | |
| 2007/0131579 A1 | 6/2007 | Koivusalmi et al. | |
| 2007/0135316 A1 | 6/2007 | Koivusalmi et al. | |
| 2007/0135663 A1 | 6/2007 | Aalto et al. | |

(Continued)

FOREIGN PATENT DOCUMENTS

CN 11270300 A 9/2008

(Continued)

*Primary Examiner* — Nina Bhat
(74) *Attorney, Agent, or Firm* — Maryann Maas

(57) ABSTRACT

A hydrocarbon product stream having hydrocarbons with boiling points in the aviation fuel range is produced from renewable feedstocks such as plant and animal oils. The process involves treating a renewable feedstock by hydrogenating, deoxygenating, isomerization, and selectively hydrocracking the feedstock to produce paraffinic hydrocarbons having from about 9 to about 16 carbon atoms and a high iso/normal ratio in a single reaction zone containing a multifunctional catalyst, or set of catalysts, having hydrogenation, deoxygenation, isomerization and selective hydrocracking functions.

15 Claims, 1 Drawing Sheet

U.S. PATENT DOCUMENTS

| | | |
|---|---|---|
| 2007/0161832 A1 | 7/2007 | Myllyoja et al. |
| 2007/0170091 A1 | 7/2007 | Monnier et al. |
| 2007/0175795 A1 | 8/2007 | Yao et al. |
| 2007/0260102 A1 | 11/2007 | Duarte Santiago et al. |
| 2007/0281875 A1 | 12/2007 | Scheibel et al. |
| 2007/0287873 A1 | 12/2007 | Coupard et al. |
| 2007/0299291 A1 | 12/2007 | Koivusalmi |
| 2008/0025903 A1 | 1/2008 | Cortright |
| 2008/0033188 A1 | 2/2008 | Dumesic et al. |
| 2008/0045731 A1 | 2/2008 | Zhang |
| 2008/0050792 A1 | 2/2008 | Zmierczak et al. |
| 2008/0052983 A1 | 3/2008 | Aulich et al. |
| 2008/0066374 A1 | 3/2008 | Herskowitz |
| 2008/0092436 A1 | 4/2008 | Seames et al. |
| 2008/0132435 A1 | 6/2008 | Ferreira Fontes et al. |
| 2008/0156694 A1 | 7/2008 | Chapus et al. |
| 2008/0161614 A1 | 7/2008 | Bertoncini et al. |
| 2008/0161615 A1 | 7/2008 | Chapus et al. |
| 2008/0163543 A1 | 7/2008 | Abhari et al. |
| 2008/0173570 A1 | 7/2008 | Marchand et al. |
| 2008/0216391 A1 | 9/2008 | Cortright et al. |
| 2008/0229654 A1 * | 9/2008 | Bradin ............................. 44/308 |
| 2008/0244962 A1 | 10/2008 | Abhari et al. |
| 2008/0281134 A1 | 11/2008 | Ghonasgi et al. |
| 2008/0300434 A1 | 12/2008 | Cortright et al. |
| 2008/0300435 A1 | 12/2008 | Cortright et al. |
| 2008/0302001 A1 | 12/2008 | Koivusalmi et al. |
| 2008/0308457 A1 | 12/2008 | Dindi et al. |
| 2008/0308458 A1 | 12/2008 | Dindi et al. |
| 2008/0312480 A1 | 12/2008 | Dindi et al. |
| 2008/0313955 A1 | 12/2008 | Silva et al. |
| 2009/0014354 A1 | 1/2009 | Knuuttila et al. |
| 2009/0019763 A1 | 1/2009 | Ghonasgi et al. |
| 2009/0029427 A1 | 1/2009 | Miller |
| 2009/0031617 A1 | 2/2009 | O'Rear |
| 2009/0062578 A1 | 3/2009 | Koivusalmi et al. |
| 2009/0069610 A1 | 3/2009 | Roberts, IV et al. |
| 2009/0071872 A1 | 3/2009 | Ginosar et al. |
| 2009/0077866 A1 | 3/2009 | Kalnes et al. |
| 2009/0082606 A1 | 3/2009 | Marker et al. |
| 2009/0084026 A1 | 4/2009 | Miller |
| 2009/0088351 A1 | 4/2009 | Miller |
| 2009/0107033 A1 | 4/2009 | Gudde et al. |
| 2009/0124839 A1 | 5/2009 | Dumesic et al. |
| 2009/0126260 A1 | 5/2009 | Aravanis et al. |
| 2009/0229172 A1 | 9/2009 | Brady et al. |
| 2009/0229174 A1 | 9/2009 | Brady et al. |

FOREIGN PATENT DOCUMENTS

| | | |
|---|---|---|
| CN | 11343552 A | 1/2009 |
| EP | 1719811 A1 | 8/2006 |
| EP | 2046917 | 1/2008 |
| WO | 2007063874 A1 | 6/2007 |
| WO | 2007064015 A1 | 6/2007 |
| WO | 2007064019 A1 | 6/2007 |
| WO | WO 2007/064019 A1 | 6/2007 |
| WO | WO 2007063874 A1 | 6/2007 |
| WO | WO 2007/064015 A1 | 6/2007 |
| WO | 2007125332 A1 | 11/2007 |
| WO | WO 2007/125332 A1 | 11/2007 |
| WO | 2007141293 A1 | 12/2007 |
| WO | WO 2007/141293 A1 | 12/2007 |
| WO | 2008012415 A2 | 1/2008 |
| WO | WO 2008/012415 A2 | 1/2008 |
| WO | 2008020048 A2 | 2/2008 |
| WO | WO 2008/020048 A2 | 2/2008 |
| WO | 2008053284 A1 | 5/2008 |
| WO | WO 2008/053284 A1 | 5/2008 |
| WO | 2008101945 A1 | 8/2008 |
| WO | WO 2008/101945 A1 | 8/2008 |
| WO | 2008105518 A1 | 9/2008 |
| WO | 2008119895 A2 | 9/2008 |
| WO | WO 2008/105518 A1 | 9/2008 |
| WO | WO 2008/119895 A2 | 9/2008 |
| WO | 2008141830 A1 | 11/2008 |
| WO | 2008141831 A1 | 11/2008 |
| WO | WO 2008/141830 A1 | 11/2008 |
| WO | WO 2008/141831 A1 | 11/2008 |
| WO | 2008151792 A1 | 12/2008 |
| WO | 2008152199 A1 | 12/2008 |
| WO | WO 2008/151792 A1 | 12/2008 |
| WO | WO 2008/152199 A1 | 12/2008 |
| WO | 2009004181 A2 | 1/2009 |
| WO | 2009011639 A2 | 1/2009 |
| WO | 2009013233 A2 | 1/2009 |
| WO | WO 2009/004181 A2 | 1/2009 |
| WO | WO 2009/011639 A2 | 1/2009 |
| WO | WO 2009/013233 A2 | 1/2009 |
| WO | 2009020055 A1 | 2/2009 |
| WO | 2009025542 A1 | 2/2009 |
| WO | WO 2009/020055 A1 | 2/2009 |
| WO | WO 2009/025542 A1 | 2/2009 |
| WO | 2009059819 A1 | 5/2009 |
| WO | 2009059920 A2 | 5/2009 |
| WO | WO 2009/059819 A1 | 5/2009 |
| WO | WO 2009/059920 A2 | 5/2009 |

* cited by examiner

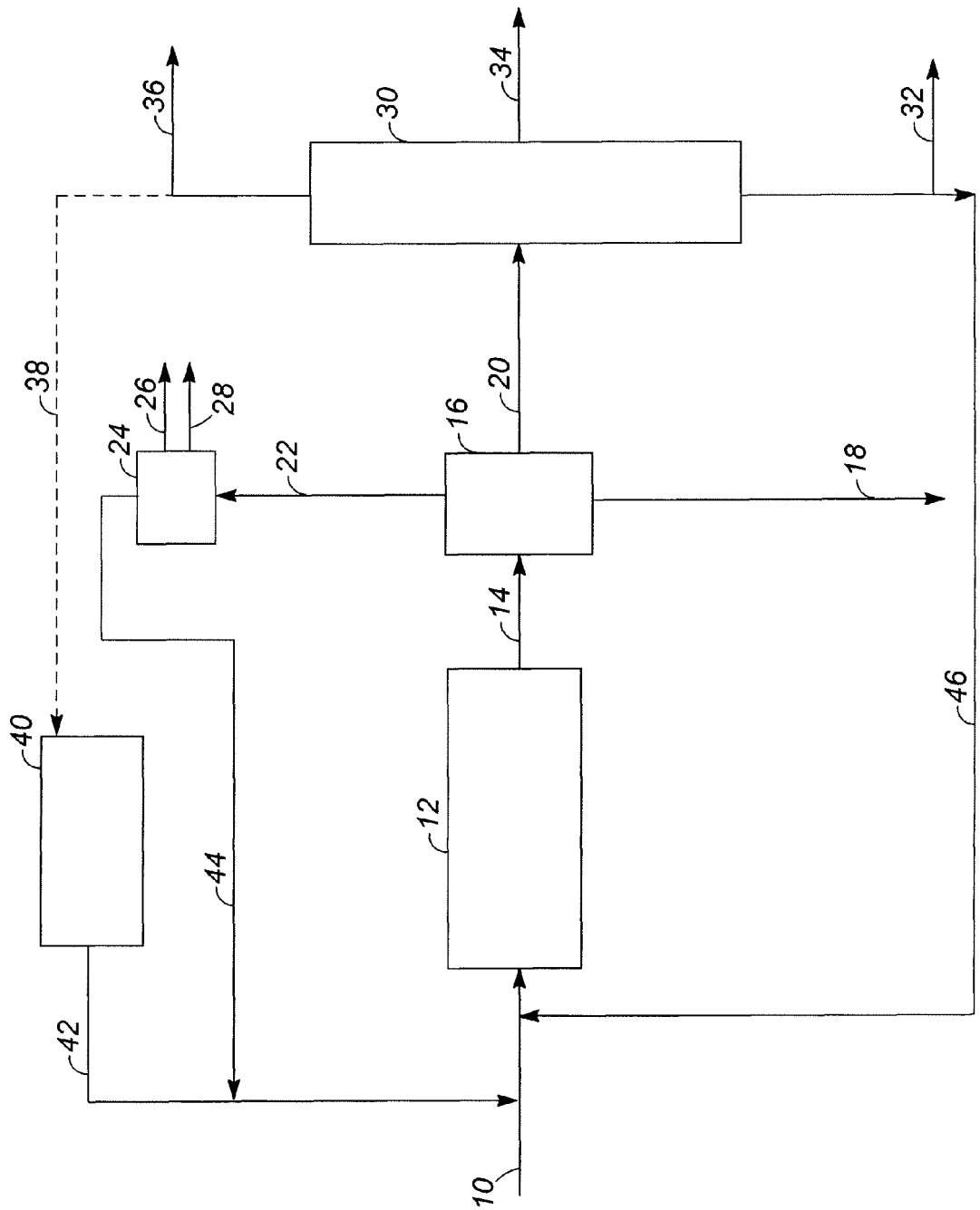

PRODUCTION OF AVIATION FUEL FROM RENEWABLE FEEDSTOCKS

CROSS-REFERENCE TO RELATED APPLICATION

This application claims priority from Provisional Application Ser. No. 61/037,066 filed Mar. 17, 2008, the contents of which are hereby incorporated by reference in its entirety.

STATEMENT REGARDING FEDERALLY SPONSORED RESEARCH OR DEVELOPMENT

This invention was made under the support of the United States Government, United States Army Research Office, with financial support from DARPA, Agreement Number W911NF-07-C-0049. The United States Government has certain rights in the invention.

BACKGROUND OF THE INVENTION

This invention relates to a process for producing hydrocarbons useful as fuel, such as aviation fuel, from renewable feedstocks such as the glycerides and free fatty acids found in materials such as plant oils, fish oils, animal fats, and greases. The process involves hydrogenation, decarboxylation, decarbonylation, and/or hydrodeoxygenation, hydroisomerization, and selective hydrocracking occurring in a single reaction stage. The single reaction stage may include multiple reactor beds or multiple reaction vessels. The selective hydrocracking reaction optimally provides one hydrocracking event per molecule. An integrated reforming step or a steam reforming step may be optionally employed to generate at least a portion of the hydrogen that is chemically consumed in reaction stage.

As the demand for fuels such as aviation fuel increases worldwide there is increasing interest in sources other than petroleum crude oil for producing the fuel. One such source is what has been termed renewable feedstocks. These renewable feedstocks include, but are not limited to, plant oils such as corn, jatropha, camelina, rapeseed, canola, soybean and algal oils, animal fats such as tallow, fish oils and various waste streams such as yellow and brown greases and sewage sludge. The common feature of these feedstocks is that they are composed of mono- di- and tri-glycerides, free fatty acids (FAA). Another class of compounds appropriate for these processes fatty acid alkyl esters (FAAE), such as fatty acid methyl ester (FAME) or fatty acid ethyl ester (FAEE). These types of compounds contain aliphatic carbon chains generally having from about 8 to about 24 carbon atoms. The aliphatic carbon chains in the glycerides, FFAs, or FAAEs can be saturated or mono-, di- or poly-unsaturated. Most of the glycerides in the renewable feed stocks will be triglycerides, but some of the glycerides in the renewable feedstock may be monoglycerides or diglycerides. The monoglycerides and diglycerides can be processed along with the triglycerides.

There are reports disclosing the production of hydrocarbons from oils. For example, U.S. Pat. No. 4,300,009 discloses the use of crystalline aluminosilicate zeolites to convert plant oils such as corn oil to hydrocarbons such as gasoline and chemicals such as para-xylene. U.S. Pat. No. 4,992,605 discloses the production of hydrocarbon products in the diesel boiling range by hydroprocessing vegetable oils such as canola or sunflower oil. Finally, US 2004/0230085 A1 discloses a process for treating a hydrocarbon component of biological origin by hydrodeoxygenation followed by isomerization.

A process which comprises a single reaction zone to hydrogenate, deoxygenate, isomerize and selectively hydrocrack a renewable feedstock, in order to generate a hydrocarbon product having paraffins with boiling points in the aviation fuel range is provided herein. The hydrocarbon product is useful as an aviation fuel or an aviation fuel blending component. Simply deoxygenating the renewable feedstock in a hydrogen environment in the presence of a hydrotreating catalyst results in straight chain paraffins having chainlengths similar to, or slightly shorter than, the fatty acid composition of the feedstock. With many feedstocks, this approach may result in a product having an appropriate carbon chain length for a diesel fuel, but not meeting the specifications for an aviation fuel. The selective hydrocracking reaction reduces the carbon chain length to maximize the selectivity to aviation fuel range paraffins while minimizing lower molecular weight products. Isomerization allows for aviation fuel specifications, such as freeze point, to be met. Successfully conducting the required reactions in a single reaction zone can result in a lower capital and operating cost structure. An optional reforming step or steam reforming step may be included to generate the hydrogen needed in the hydrogenation, deoxygenation, and the hydrocracking reactions. In one embodiment, a portion of the effluent of the reaction zone is recycled to the reaction zone. The volume ratio of recycle hydrocarbon to feedstock ranges from about 0.1:1 to about 8:1 and provides a mechanism to limit the reaction zone temperature rise, increase the hydrogen solubility and more uniformly distribute the heat of reaction in the reaction mixture. As a result of the recycle, some embodiments may use less processing equipment, less excess hydrogen, a lower operating pressure, less utilities, or any combination of the above. In another embodiment, hydrogen may be supplied by integrating the process into an existing hydrogen generating facility such as a refinery.

SUMMARY OF THE INVENTION

The process is for producing a hydrocarbon product from a renewable feedstock, the hydrocarbon product comprising hydrocarbons having boiling points in the aviation fuel range. The process comprises hydrogenating, deoxygenating (including decarboxylation, decarbonylation, and hydrodeoxygenation), isomerizing, and selectively hydrocracking the renewable feedstock in a reaction zone in the presence of hydrogen and at reaction conditions, by contacting the renewable feedstock with a multifunctional catalyst or a set of catalysts having hydrogenation, deoxygenation, isomerization, and selective hydrocracking functions to provide a reaction effluent comprising water, carbon oxides, light hydrocarbon gasses, hydrogen and paraffinic hydrocarbons. The water, carbon oxides, light hydrocarbon gasses, and hydrogen are separated from the reaction effluent to generate a liquid stream comprising the paraffinic hydrocarbons. The stream comprising the paraffinic hydrocarbons is separated to generate the hydrocarbon product comprising hydrocarbons having boiling points in the aviation fuel range; an overhead stream comprising naphtha; and a bottoms stream comprising components having boiling points higher than the aviation fuel boiling point range. The hydrocarbon product stream is recovered.

In one embodiment, a portion of the paraffins generated in the reaction zone is recycled to the reaction zone with a volume ratio of recycle to feedstock in the range of about 0.1:1 to about 8:1 in order to increase the solubility of hydrogen in deoxygenation reaction mixture and to minimize the severity of the hydrocracking per pass. In another embodiment the volume ratio of recycle to feedstock in the range of about 2:1 to about 8:1. The recycled portion of the paraffins generated in the reaction zone may include all or a portion of the hydrocarbons having boiling points higher than aviation fuel. An optional reforming or steam reforming step may be included in order to produce hydrogen needed in the hydrogenation, deoxygenation, hydroisomerization, and selective hydrocracking reactions.

BRIEF DESCRIPTION OF THE DRAWING

The FIGURE is a general flow scheme diagram of the invention including the optional steam reforming zone and the hydrocarbon recycle.

DETAILED DESCRIPTION OF THE INVENTION

As stated, the present invention relates to a process for producing a hydrocarbon product stream having hydrocarbons with boiling points in the aviation fuel range from renewable feedstocks originating from plants or animals other than petroleum feedstocks. Therefore the hydrocarbon product is useful as an aviation fuel or an aviation fuel blending component. The term renewable feedstock is meant to include feedstocks other than those obtained directly from petroleum crude oil. Another term that has been used to describe this class of feedstocks is renewable fats and oils. The renewable feedstocks that can be used in the present invention include any of those which comprise glycerides and free fatty acids (FFA). Examples of these feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm kernel oil, crambe oil, and the like. Biorenewable is another term used to describe these feedstocks. The glycerides, FFAs, and fatty acid alkyl esters, of the typical vegetable oil or animal fat contain aliphatic hydrocarbon chains in their structure which have about 8 to about 24 carbon atoms with a majority of the oils containing high concentrations of fatty acids with 16 and 18 carbon atoms. Mixtures or co-feeds of renewable feedstocks and fossil fuel derived hydrocarbons may also be used as the feedstock. Other feedstock components which may be used, especially as a co-feed component in combination with the above listed feedstocks, include spent motor oil and industrial lubricants, used paraffin waxes, liquids derived from gasification of coal, biomass, or natural gas followed by a downstream liquefaction step such as Fischer-Tropsch technology; liquids derived from depolymerization, thermal or chemical, of waste plastics such as polypropylene, high density polyethylene, and low density polyethylene; and other synthetic oils generated as byproducts from petrochemical and chemical processes. Mixtures of the above feedstocks may also be used as co-feed components. One advantage of using a co-feed component is the transformation of what has been considered to be a waste product from a fossil fuel based or other process into a valuable co-feed component to the current process.

The hydrocarbon product stream generated in the present invention is suitable for, or as a blending component for, uses such as an aviation fuel. Depending upon the application, various additives may be combined with the fuel composition generated in order to meet required specifications for different specific fuels. In particular, the hydrocarbon product stream generated herein complies with, is a blending component for, or may be combined with one or more additives to meet at least one of: ASTM D 1655 Specification for Aviation Turbine Fuels Defense Stan 91-91 Turbine Fuel, Aviation Kerosene Type, Jet A-1 NATO code F-35, F-34, F-37 Aviation Fuel Quality Requirements for Jointly Operated Systems (Joint Checklist) A combination of ASTM and Def Stan requirements GOST 10227 Jet Fuel Specifications (Russia) Canadian CAN/CGSB-3.22 Aviation Turbine Fuel, Wide Cut Type Canadian CAN/CGSB-3.23 Aviation Turbine Fuel, Kerosene Type MIL-DTL-83133, JP-8, MW-DTL-5624, JP-4, JP-5 QAV-1 (Brazil) Especifcacao de Querosene de Aviacao No. 3 Jet Fuel (Chinese) according to GB6537 DCSEA 134A (France) Carbureacteur Pour Turbomachines D'Aviation, Type Kerosene Aviation Turbine Fuels of other countries, meeting the general grade requirements for Jet A, Jet A-1, Jet B, and TS-1 fuels as described in the IATA Guidance Material for Aviation Turbine Fuel Specifications. The aviation fuel is generally termed "jet fuel" herein and the term "jet fuel" is meant to encompass aviation fuel meeting the specifications above as well as to encompass aviation fuel used as a blending component of an aviation fuel meeting the specifications above. Additives may be added to the jet fuel in order to meet particular specifications. One particular type of jet fuel is JP-8, defined by Military Specification ML-DTL-83133, which is a military grade type of highly refined kerosene based jet propellant specified by the United States Government. The fuel produced from glycerides or FAA as described herein is very similar to isoparaffinic kerosene or iPK, also known as a synthetic paraffinic kerosene (SPK) or synthetic jet fuel.

Renewable feedstocks that can be used in the present invention may contain a variety of impurities. For example, tall oil is a by product of the wood processing industry and tall oil contains esters and rosin acids in addition to FFAs. Rosin acids are cyclic carboxylic acids. The renewable feedstocks may also contain contaminants such as alkali metals, e.g. sodium and potassium, phosphorous as well as solids, water and detergents. An optional first step is to remove as much of these contaminants as possible. One possible pretreatment step involves contacting the renewable feedstock with an ion-exchange resin in a pretreatment zone at pretreatment conditions. The ion-exchange resin is an acidic ion exchange resin such as Amberlyst™-15 and can be used as a bed in a reactor through which the feedstock is flowed through, either upflow or downflow. Another technique involves contacting the renewable feedstock with a bleaching earth, such as bentonite clay, in a pretreatment zone.

Another possible means for removing contaminants is a mild acid wash. This is carried out by contacting the feedstock with an acid such as sulfuric, nitric, phosphoric, or hydrochloric and water in a reactor. The acidic aqueous solution and feedstock can be contacted either in a batch or continuous process. Contacting is done with a dilute acid solution usually at ambient temperature and atmospheric pressure. If the contacting is done in a continuous manner, it is usually done in a counter current manner. Yet another possible means of removing metal contaminants from the feedstock is through the use of guard beds which are well known in the art. These can include alumina guard beds either with or without demetallation catalysts such as nickel or cobalt. Various forms of aluminas are suitable. Filtration and solvent extraction techniques are other choices which may be employed. Hydroprocessing such as that described in U.S. application Ser. No. 11/770,826 is another pretreatment technique which may be employed. Hydrolysis may be used to convert triglycerides to a contaminant mixture of free fatty acids and hydrothermolysis may be used to convert triglycerides to oxygenated cycloparaffins.

The renewable feedstock is flowed to a single reaction zone or stage comprising one or more catalyst beds in one or more reactor vessels. Within a single reaction zone or stage, multiple beds or vessels may be employed, but no product separation is performed between the beds or vessels. The term feedstock is meant to include feedstocks that have not been treated to remove contaminants as well as those feedstocks purified in a pretreatment zone or an oil processing facility. In the reaction zone, the renewable feedstock is contacted, in the presence of hydrogen, with a multifunctional catalyst or set of catalysts comprising deoxygenation, hydrogenation, isomerization and selective hydrocracking functions.

A number of reactions occur concurrently within the reaction zone. The order of the reactions is not critical to the invention and the reactions may occur in various orders. One reaction occurring in the reaction zone is hydrogenation to saturate olefinic compounds in the reaction mixture. Another type of reaction occurring in the reaction zone is deoxygenation. The deoxygenation of the feedstock may proceed through different routes such as decarboxylation, decarbonylation, and/or hydrodeoxygenation in order to remove oxygen from the feedstock. Decarboxylation, decarbonylation, and hydrodeoxygenation are herein collectively referred to as deoxygenation reactions.

Depending upon the feedstock, the product of the hydrogenation and deoxygenation steps contains paraffinic hydrocarbons suitable for use as diesel fuel or as a blending component for diesel fuel, but further isomerization and selective hydrocracking results in isoparaffinic hydrocarbons meeting the specifications for other fuels or as blending components for other fuels. The product from some feedstocks may not require selective hydrocracking. As illustrative of this concept, a concentration of paraffins formed from renewable feedstocks typically have about 15 to 18 carbon atoms, but additional paraffins may be formed to provide a range of from about 8 to about 24 carbon atoms. Different feedstocks will have different distributions of paraffins, and some renewable feedstocks may not require hydrocracking. The about 9 to about 24 carbon number range is a desired paraffin carbon number range for diesel fuel, which is a valuable fuel itself. Aviation fuel, however, generally comprises paraffins having boiling points from about 132° C. or 140° C. to about 300° C. which overlaps a portion of the diesel fuel range. To convert the diesel range fuel to a fuel useful for aviation, the larger chain-length paraffins are hydrocracked. Typical hydrocracking processes are likely to over-crack the paraffins and generate a large quantity of less valuable low molecular weight molecules. Therefore another reaction occurring in the reaction zone is the selective hydrocracking of the paraffins generated from the renewable feedstock. Selective hydrocracking is used in order to control the degree of hydrocracking and maximize the amount of product formed in the desired carbon number range. The selective hydrocracking is controlled through catalyst choice and reaction conditions. Ideally, each paraffin molecule would experience only a single hydrocracking event and ideally that single hydrocracking event would result in at least one paraffin in the C8 to C16 carbon number range. The selective hydrocracking may proceed through several different routes.

However, fuel specifications are typically not based upon carbon number ranges. Instead, the specifications for different types of fuels are often expressed through acceptable ranges of chemical and physical requirements of the fuel. For example, aviation turbine fuels, a kerosene type fuel including JP-8, are specified by MIL-DTL-83133, JP-4, a blend of gasoline, kerosene and light distillates, is specified by ML-DTL-5624 and JP-5 a kerosene type fuel with low volatility and high flash point is also specified by ML-DTL-5624, with the written specification of each being periodically revised. Often a distillation range from 10 percent recovered to a final boiling point is used as a key parameter defining different types of fuels. The distillations ranges are typically measured by ASTM Test Method D 86 or D2887. Therefore, blending of different components in order to meet the specification is quite common. While the product of the present invention may meet fuel specifications, it is expected that some blending of the product with other blending components may be required to meet the desired set of fuel specifications or future specific specifications required for such fuels. In other words, the product of this invention may be a component which is used in a mixture with other components to form a fuel meeting at least one of the specifications for aviation fuel such as JP-8. The desired product is a highly paraffinic distillate fuel component having a paraffin content of at least 75% by volume.

Finally, selective hydrocracking must be accompanied by sufficient isomerization to prevent poor cold flow properties. Aviation fuel and aviation blending components must have better cold flow properties than achievable with essentially all n-paraffins and so yet another reaction occurring in the reaction zone is isomerization to isomerize at least a portion of the n-paraffins to branched paraffins. Again, the yield of isomerization needed is dependant upon the specifications required for the final fuel product. Some fuels require a lower cloud or freeze point and thus need a greater yield from the isomerization reaction to produce a larger concentration of branched-paraffins. Alternatively, when hydrocracked fuel is used exclusively as a blending component, the isomerization step may not be necessary.

As mentioned above, the multifunctional catalyst or set of catalysts comprise deoxygenation, hydrogenation, isomerization and selective hydrocracking functions. The deoxygenation and hydrogenation functions, which may be the same or separate active sites, may be noble metals such as a platinum group metals including but not limited to ruthenium, rhodium, palladium, platinum, and mixtures thereof at levels ranging from about 0.05 to about 2.0 weight-% of the catalytic composite. Some catalysts may contain up to about 10 wt.-% platinum or palladium on carbon. Examples of other active sites that may be employed to provide the deoxygenation and hydrogenation functions are sulfided base metals such as sulfided NiMo or sulfided NiW. A base metal is a metal which oxidizes when heated in air, and other base metals, in addition to nickel, molybdenum and tungsten, which may be a catalyst component herein include iron, lead, zinc, copper, tin, germanium, chromium, titanium, cobalt, rhenium, indium, gallium, uranium, dysprosium, thallium and mixtures and compounds thereof. As to the isomerization and selective hydrocracking functions, the second portion of the catalyst composite may contain a zeolite with an acid function capable of catalyzing the isomerization and selective hydrocracking reactions. The zeolite concentration can range from about 1 to about 99 weight percent of the catalyst composite depending upon the type of zeolite employed and the operating conditions. In one embodiment, the zeolite contains medium to large size pores with 10-12 member rings such as BEA, MOR, MFI, or FAU. In other embodiments, the cracking function is a non-crystalline acid site found in materials such as amorphous silica-aluminas. In another embodiment, a portion of the support has high external surface area, greater than about 150 $m^2/g$, or large mesopores, greater than 45

Angstrom average pore diameter, for maximum accessibility of the large triglyceride molecules to the catalytic active sites. This is beneficial since a highly porous structure with large openings will reduce diffusion problems that might otherwise prevent the large glyceride molecules from contacting the active sites of the catalyst. Furthermore, large pores will prevent diffusional resistance for the aviation-range paraffins produced in this catalytic process and present further cracking to lower value light products. Examples of catalysts, or sets of catalysts, successful in catalyzing the deoxygenation, hydrogenation, isomerization, and selective hydrocracking reactions in the same reaction zone include platinum dispersed on a support containing Y-zeolite. Another example is platinum and palladium on a support containing Y-zeolite bound with amorphous silica alumina. An example of a set of catalysts include sulfided NiMo supported on amorphous silica alumina and platinum supported on amorphous silica alumina.

The catalyst function for deoxygenation and hydrogenation will be similar to those already known for hydrogenation or hydrotreating. The hydrogenation or hydrotreating catalyst function reacts with hydrogen at hydrogenation conditions to hydrogenate the olefinic or unsaturated portions of the fatty acid chains. Hydrogenation or hydrotreating catalyst functions are any of those well known in the art such as nickel or sulfided nickel and molybdenum or nickel tungsten dispersed on a high surface area support. Other hydrogenation catalyst functions include one or more noble metal elements dispersed on a high surface area support. Non-limiting examples of noble metals include Pt and/or Pd dispersed on gamma-alumina.

The hydrogenation and hydrotreating catalyst functions enumerated above are also capable of catalyzing decarboxylation, decarbonylation, and/or hydrodeoxygenation of the feedstock to remove oxygen. Decarboxylation, decarbonylation, and hydrodeoxygenation are herein collectively referred to as deoxygenation reactions. The order in which the reactions take place is not critical to the invention.

Catalyst functions and conditions for selective hydrocracking and isomerization are well known in the art. See for example US 2004/0230085 A1 which is incorporated by reference in its entirety. Many catalysts well know for isomerization can also become selective cracking catalyst functions at more severe conditions. The same catalyst may be employed for both the isomerization and the selective hydrocracking, or two or more different catalysts may be employed. Due to the presence of hydrogen, these reactions may also be called hydroisomerization and hydrocracking.

Overall, the isomerization of the paraffinic product can be accomplished in any manner known in the art or by using any suitable catalyst known in the art. Many of the isomerization catalyst functions are also suitable selective hydrocracking functions, although some may require different conditions than would be employed for isomerization alone. In general, catalysts or catalytic components having an acid function and mild hydrogenation function are favorable for catalyzing both the isomerization reaction and the selective hydrocracking reaction. For a single multi-component catalyst the same active site employed for deoxygenation can also serve as the mild hydrogenation function for the selective hydrocracking and isomerization reactions. In general, suitable selective hydrocracking/isomerization catalysts comprise a metal of Group VIII (IUPAC 8-10) of the Periodic Table and a support material. Suitable Group VIII metals include platinum and palladium, each of which may be used alone or in combination. The support material may be amorphous or crystalline, or a combination of the two. Suitable support materials include, aluminas, amorphous aluminas, amorphous silica-aluminas, ferrierite, ALPO-31, SAPO-11, SAPO-31, SAPO-37, SAPO-41, SM-3, MgAPSO-31, FU-9, NU-10, NU-23, ZSM-12, ZSM-22, ZSM-23, ZSM-35, ZSM-48, ZSM-50, ZSM-57, MeAPO-11, MeAPO-31, MeAPO-41, MeAPSO-11, MeAPSO-31, MeAPSO-41, MeAPSO-46, ELAPO-11, ELAPO-31, ELAPO-41, ELAPSO-11, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-11, SAPO-31, SAPO-37, and SAPO-41 are described in U.S. Pat. No. 4,440,871. SM-3 is described in U.S. Pat. Nos. 4,943,424; 5,087,347; 5,158,665; and U.S. Pat. No. 5,208,005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for selective hydrocracking and isomerization by removing associated alkali metal or alkaline earth metal by ammonium ion exchange and calcination to produce the substantially hydrogen form, as taught in U.S. Pat. No. 4,795,623 and U.S. Pat. No. 4,924,027. Further catalysts and conditions for skeletal isomerization are disclosed in U.S. Pat. Nos. 5,510,306, 5,082,956, and U.S. Pat. No. 5,741,759.

The selective hydrocracking/isomerization catalyst function may also comprise a modifier selected from the group consisting of lanthanum, cerium, praseodymium, neodymium, phosphorus, samarium, gadolinium, terbium, and mixtures thereof, as described in U.S. Pat. No. 5,716,897 and U.S. Pat. No. 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449. The teachings of U.S. Pat. Nos. 4,310,440; 4,440,871; 4,793,984; 4,758,419; 4,943,424; 5,087,347; 5,158,665; 5,208,005; 5,246,566; 5,716,897; and U.S. Pat. No. 5,851,949 are hereby incorporated by reference.

U.S. Pat. No. 5,444,032 and U.S. Pat. No. 5,608,968 teach a suitable bifunctional catalyst which is constituted by an amorphous silica-alumina gel and one or more metals belonging to Group VIIIA, and is effective in the hydroisomerization of long-chain normal paraffins containing more than 15 carbon atoms. U.S. Pat. Nos. 5,981,419 and 5,908,134 teach a suitable bifunctional catalyst which comprises: (a) a porous crystalline material isostructural with beta-zeolite selected from boro-silicate (BOR-B) and boro-alumino-silicate (Al-BOR-B) in which the molar $SiO_2:Al_2O_3$ ratio is higher than 300:1; (b) one or more metal(s) belonging to Group VIIIA, selected from platinum and palladium, in an amount comprised within the range of from 0.05 to 5% by weight. Article V. Calemma et al., App. Catal. A: Gen., 190 (2000), 207 teaches yet another suitable catalyst.

The catalysts for the selective hydrocracking process typically comprise at least a hydrocracking component and a non hydrocracking component. Compositing the catalyst with active and non active hydrocracking components may positively affect the particle strength, cost, porosity, and performance. The non hydrocracking components are usually referred to as the support. However, some traditional support materials such as silica-aluminas may make some contribution to the hydrocracking capability of the catalyst. One example of a suitable catalyst is a composite of zeolite beta and an alumina or a silica alumina. Other inorganic refractory materials which may be used as a support in addition to silica-alumina and alumina include for example silica, zirconia, titania, boria, and zirconia-alumina. These support materials may be used alone or in any combination. Other examples of catalysts are based on zeolite Y or ZSM-5. Another group has primarily amorphous hydrocracking components.

The catalyst or set of catalysts of the subject process can be formulated using industry standard techniques. It is may be manufactured in the form of a cylindrical extrudate having a diameter of from about 0.8 to about 3.2 mm (1/32 in to about 1/8 in). The catalyst can be made in any other desired form such as a sphere or pellet. The extrudate may be in forms other than a cylinder such as the form of a well-known trilobe or other shape which has advantages in terms or reduced diffusional distance or pressure drop.

A non-selective catalyst function may be utilized under conditions optimized to result in selective hydrocracking, where primary hydrocracking is accomplished with minimal secondary hydrocracking. Furthermore, a non-selective catalyst function may be modified to weaken the acidity of the catalyst in order to minimize undesired hydrocracking.

One class of suitable selective hydrocracking catalyst functions are the shape-selective catalysts. Highly isomerized paraffins are more readily cracked as compared to straight chain or mono-substituted paraffins since they can crack through stabilized carbenium-ion intermediates. Unfortunately, this leads to the tendency for these molecules to over crack and form lighter molecules outside the preferred aviation fuel range. Highly isomerized paraffins are also more likely to crack than the other paraffins and can be prevented from entering the pore structures of some molecular sieves. A shape-selective catalyst would prevent the majority of highly isomerized molecules from entering the pore structure and hydrocracking leaving only straight-chain or slightly isomerized paraffins to crack in the catalyst pores. Furthermore, small to medium size pore molecular sieves with 8 to 10 member ring openings prevent easy diffusion of the long chain paraffins deep into the pore system. The end of a long chain paraffin enters the pore channel of the catalyst and encounters a dehydrogenation active site, such as platinum, resulting in an olefin. Protonation of the olefins yields a carbenium ion which rearranges by methyl shift to form a carbenium ion with a single methyl branch, then via O-elimination, the hydrocarbon cracks at the site of the methyl branch yielding two olefins, one short chain and one long chain. In this way, beta scission hydrocracking, the primary mechanism for Bronsted acids, will occur close to the pore mouth of the catalyst. Since diffusion is limited, hydrocracking will be primarily at the ends of the paraffins. Examples of suitable catalysts for this route include ZSM-5, ZSM-23, ZSM-11, ZSM-22 and ferrierite. Further suitable catalysts are described in Arroyo, J. A. M.; Martens, G. G.; Froment, G. F.; Marin, G. B.; Jacobs, P. A.; martens, J. A., Applied Catalysis, A: General, 2000, 192(1) 9-22; Souverijins, W.; Martins, J. A.; Froment, G. F.; Jacobs, P. A., Journal of Catalysis, 1998, 174(2) 177-184; Huang, W.; Li, D.; Kang, X; Shi, Y.; Nie, H. Studies in Surface Science and Catalysis, 2004, 154, 2353-2358; Claude, M. C.; Martens J. A. Journal of Catalysis, 2000, 190(1), 39-48; Sastre, G.; Chica, A.; Conna, A., Journal of Catalysis, 2000, 195(2), 227-236.

In one embodiment, the selective hydrocracking catalyst also contains a metallic hydrogenolysis component. The hydrogenolysis component is provided as one or more base metals uniformly distributed in the catalyst particle. Noble metals such as platinum and palladium could be applied, or the composition of the metal hydrogenolysis component may be, for example, nickel, iridium, rhenium, rhodium, or mixtures thereof. The hydrogenolysis function preferentially cleaves C1 to C6 fragments from the end of the paraffin molecule. Two classes of catalysts are suitable for this approach. A first class is a catalyst having a hydrogenolysis metal with a mechanistic preference to crack the ends of the paraffin molecules. See, for example, Carter, J. L.; Cusumano, J. A.; Sinfelt, J. H. Journal of Catalysis, 20, 223-229 (1971) and Huang, Y. J.; Fung, S. C.; Gates, W. E.; McVicker, G. B. journal of Catalysis 118, 192-202 (1989). The second class of catalysts include those where the hydrogenolysis function is located in the pore mouth of a small to medium pore molecular sieve that prevent facile diffusion of the long chain paraffin molecule into the pores system. Also, since olefins are easier to protonate, and therefore crack, as compared to paraffins, the dehydrogenation function component may be minimized on the external surface of the catalyst to maintain the selectivity of the hydrocracking. Examples of suitable catalysts for this hydrogenolysis route of selective hydrocracking include silicalite, ferrierite, ZSM-22, ZSM-23 and other small to medium pore molecular sieves.

Another suitable type of catalysts include molecular sieves with strong pore acidity, which when used a higher operating temperatures promote Haag Dessau hydrocracking; a type of acid-catalyst hydrocracking that does not require isomerization or a bifunctional catalyst as described in Weitkamp et al. Agnew. Chem. Int. ed. 2001, 40, No. 7, 1244. The intermediate is a carbonium ion formed after protonation of a carbon-carbon or carbon-hydrogen bond. The catalyst does not need a significant dehydrogenation function since the olefin is not necessary. Residence time on these strong acid sites would need to be minimized to prevent extensive hydrocracking by techniques such as reducing the acid site density or operating at a higher space velocity. An example of a suitable catalyst for this approach is ZSM-5.

Large pore zeolites such as zeolite Beta and zeolite Y with 12 member rings also serve as successful hydrocracking and isomerization functions at mild processing conditions. They can be made more selective be raising their Si/Al ration through well known means such as steaming or acid-washing. They are further improved towards selective hydrocracking when the length of the pore channels are reduced such as when nanocrystallites are used. The shorter pore lengths limit the amount of secondary hydrocracking since the product molecules can easily and quickly diffuse away from the zeolite after primary hydrocracking.

The one stage process to convert natural oils and fats to aviation range paraffins at high iso/normal ratios, operate at a range of conditions that successfully allows very high levels of deoxygenation and hydrogenation, provides significant yields of aviation range paraffins while minimizing light gas and naphtha production. Therefore, the operating conditions in many instances are refinery or processing unit specific. They may be dictated in large part by the construction and limitations of the existing unit, which normally cannot be changed without significant expense, the composition of the feed and the desired products. The inlet temperature of the catalyst bed should be in the range of from about 150° C. to about 454° C. (about 300° F. to about 850° F.), and the inlet pressure should be above about 1379 kPa gauge to about 13,790 kPa gauge (200 to about 2,000 psig). The feed stream is admixed with sufficient hydrogen to provide hydrogen circulation rate of about 168 to 1684 n.l/l (1000 to 10000

SCF/barrel, hereafter SCFB) and passed into the reactor containing the catalyst or set of catalysts. The hydrogen will be primarily derived from a recycle gas stream which may pass through purification facilities for the removal of acid gases. The hydrogen rich gas admixed with the feed and in one embodiment any recycle hydrocarbons will contain at least 90 mol percent hydrogen. The feed rate in terms of liquid hourly space velocity (L.H.S.V.) will normally be is within the broad range of about 0.3 to about 5 $hr^{-1}$, with a L.H.S.V. below 1.2 being used in one embodiment.

The different reactions types, hydrogenation, deoxygenation, isomerization and selective hydrocracking may be carried out using the same catalyst or using a set of different catalysts. In this embodiment, both isomerization and selective hydrocracking occur concurrently. Examples of catalysts suitable for all reaction types include, but are not limited to, platinum and/or palladium on: zeolite Y, ZSM-5, amorphous silica alumina, MOR, SAPO-11 and/or SM3. Another example is sulfided nickel and molybdenum on: zeolite Y, ZSM-5, amorphous silica alumina, MOR, SAPO-11 and/or SM3.

Hydrogen is a reactant in the reactions above, and to be effective, a sufficient quantity of hydrogen must be in solution to most effectively take part in the catalytic reaction. If hydrogen is not available at the reaction site of the catalyst, the coke forms on the catalyst and deactivates the catalyst. To solve this kind of problem, the pressure in a reaction zone is often raised to insure enough hydrogen is available to avoid coking reactions on the catalyst. The process herein is flexible regarding the operating pressure so that an operator can respond to economic conditions by shifting the deoxygenation pathway. For example, when hydrogen is not too expensive relative to feed cost, an operator may choose to run at higher pressure to favor hydrodeoxygenation and maximize product yield. Suitable pressures may range up to about 5171 k Pa gauge (750 psig), 5515 kPa gauge (800 psig), 5860 kPa gauge (850 psig), about 6205 Pa gauge (900 psig), 6895 kPa gauge (1000 psig), or 8274 kPa gauge (1200 psig). However, higher pressure operations are more costly to build and to operate as compared to their lower pressure counterparts. An advantage of one embodiment of the present invention is that the operating pressure may be in the range of about 1379 kpa absolute (200 psia) to about 4826 kPa absolute (700 psia) which is lower than traditionally used in a deoxygenation zone. In another embodiment, the operating pressure is in the range of about 2413 kPa absolute (350 psia) to about 4481 kPa absolute (650 psia), and in yet another embodiment operating pressure is in the range of about 2758 kPa absolute (400 psia) to about 4137 kPa absolute (600 psia). Furthermore, with the increased hydrogen in solution, the rate of reaction is increased resulting in a greater amount of throughput of material through the reactor in a given period of time. The process is flexible regarding pressure so that the operator can respond to economic conditions by shifting the deoxygenation pathway. That is, an operator may run at low pressure to favor decarboxylation when hydrogen is expensive, but sacrifice some yield in the final product through the loss of carbon. On the other hand, when hydrogen is not too expensive relative to the feed cost, the operator may choose to run at higher pressures to favor hydrodeoxygenation and maximize product yield.

In one embodiment of the invention the desired amount of hydrogen is kept in solution at lower pressures by employing a large recycle of hydrocarbon. Other exothermic processes have employed hydrocarbon recycle in order to control the temperature in the reaction zones. However, the range of recycle to feedstock ratios that may be used herein is set based on the need to control the level of hydrogen in the liquid phase and therefore reduce the deactivation rate. The amount of recycle is determined not on temperature control requirements, but instead, based upon hydrogen solubility requirements. Hydrogen has a greater solubility in the hydrocarbon product than it does in the feedstock. By utilizing a large hydrocarbon recycle the solubility of hydrogen in the liquid phase in the reaction zone is greatly increased and higher pressures are not needed to increase the amount of hydrogen in solution and avoid catalyst deactivation at low pressures. In one embodiment of the invention, the volume ratio of hydrocarbon recycle to feedstock is from about 0.5:1 to about 8:1. In another embodiment the ratio is in the range of about 2:1 to about 6:1. In another embodiment the ratio is in the range of about 3:1 to about 6:1 and in yet another embodiment the ratio is in the range of about 4:1 to about 5:1. The ranges of suitable volume ratios of hydrocarbon recycle to feedstock are described in pending application U.S. application Ser. No. 12/193,149. Suitable ranges for hydrogen solubility were shown to begin at about a recycle to feed ratio of about 2:1. From recycle to feed ratios of about 2:1 through 6:1 the simulation of U.S. application Ser. No. 12/193,149 showed that the hydrogen solubility remained high. Thus, the specific ranges of vol/vol ratios of recycle to feed for this embodiment is determined based on achieving a suitable hydrogen solubility in the deoxygenation reaction zone.

In another embodiment, instead of recycling hydrocarbon, one or more of the co-feed components discussed above may be used to provide the solubility of hydrogen and temperature control. Depending upon the relative costs of the hydrocarbon and the co-feed component, one embodiment may be more economic than the other. It is important to note that the recycle or co-feed is optional and the process does not require recycle or co-feed. Complete deoxygenation and hydrogenation may be achieved without recycle or co-feed components. In still another embodiment, the process may be conducted with continuous catalyst regeneration in order to counteract the catalyst deactivation effects of the lower amounts of hydrogen in solution or the higher operating conditions.

The product of the reaction zone is conducted to a separator to remove the byproducts of the reaction zone reactions. Either a cold or a hot separator may be used. When a cold separator is used, the water is removed as a liquid from the bottom of the separator, and when a hot separator is used, the water is removed as a vapor in the overhead stream of the separator. Therefore, the overhead stream from the separator comprises at least propane and light ends, carbon oxides and hydrogen sulfide. Additionally the overhead stream from the separator may comprise water vapor. The carbon oxides and hydrogen sulfide may be removed be techniques such as scrubbing. Suitable scrubbing techniques are described in U.S. application No. 60/973,792 and U.S. application No. 60/973,816 each hereby incorporated by reference in its entirety. After the carbon oxides and/or the hydrogen sulfide has been removed from the overhead stream, the propane and other light ends are directed to an optional steam reforming zone, discussed below. If the separator is operated as a hot separator and water vapor is present in the separator overhead, the water is optionally retained in the carbon oxide and hydrogen sulfide scrubber, condensed from the hydrocarbon stream, or co-fed with the light ends to the steam reformer. The temperature of the separator may be from about ambient temperature to about 454° C. (about 850° F.), and the pressure may be from about 1379 kPa gauge to about 13,790 kPa gauge (200 to about 2,000 psig). In one embodiment, the temperature is from about 150° C. to about 454° C. (about 300° F. to about 850° F.).

The paraffins produced in the reaction zone are removed from the separator and carried to a fractionation zone to separate the paraffins into different product ranges. Naphtha and any LPG may be separated into an overhead stream from the fractionation zone. A portion of the naphtha may be optionally conducted to the steam reforming zone. The range of hydrocarbons that satisfy the requirements for a specific aviation fuel is removed from the fractionation zone. If there are any paraffins that have boiling points higher than that of the aviation fuel, those heavier paraffins may be removed in a bottoms stream from the fractionation zone. The operating conditions of the fractionation zone may be varied depending upon the feedstock, the type of paraffins generated in the reaction zone, and the desired fuel to be produced in order to separate the desired hydrocarbons into the sidecut.

Optionally the process may employ a steam reforming zone in order to provide hydrogen to the hydrogenation/ deoxygenation zone, isomerization zone, and/or selective hydrocracking zone. The steam reforming process is a well known chemical process for producing hydrogen, and is the most common method of producing hydrogen or hydrogen and carbon oxide mixtures. A hydrocarbon and steam mixture is catalytically reacted at high temperature to form hydrogen, and the carbon oxides: carbon monoxide and carbon dioxide. Since the reforming reaction is strongly endothermic, heat must be supplied to the reactant mixture, such as by heating the tubes in a furnace or reformer. A specific type of steam reforming is autothermal reforming, also called catalytic partial oxidation. This process differs from catalytic steam reforming in that the heat is supplied by the partial internal combustion of the feedstock with oxygen or air, and not supplied from an external source. In general, the amount of reforming achieved depends on the temperature of the gas leaving the catalyst; exit temperatures in the range of about 700° C. to about 950° C. are typical for conventional hydrocarbon reforming. Pressures may range up to about 4000 kPa absolute. Steam reforming catalysts are well known and conventional catalysts are suitable for use in the present invention.

Typically, natural gas is the most predominate feedstock to a steam reforming process. However, in the present invention, hydrocarbons that are too light for the desired product may be generated at any of the reaction zones. For example, in the deoxygenation zone, propane is a common by product. Other C1 to C3 paraffins may be present as well. These lighter components may be separated from the desired portion of the deoxygenation effluent and routed to the steam reforming zone for the generation of hydrogen. Similarly, paraffins having eight or less carbon atoms from the effluent of the collective isomerization and selective hydrocracking steps may be conducted to the reforming zone. Therefore, the lighter materials from the deoxygenation, isomerization and hydrocracking zones are directed, along with stream, to a reforming zone. In the reforming zone, the lighter hydrocarbons and steam are catalytically reacted to form hydrogen and carbon oxides. The steam reforming product may be recycled to any of the reaction zones to provide at least hydrogen to the reaction zone. Optionally, the hydrogen may be separated from the carbon oxides generated in the steam reforming reaction, and the separated hydrogen may be recycled to any of the reaction zones. Since hydrogen produced from natural gas is an expensive resource and generates unwanted greenhouse gasses, generating at least a portion of the required hydrogen from the undesired renewable products of the reaction zones can decrease the cost of the process and make it more environmentally friendly. This feature becomes more valuable when an external source of hydrogen is not readily available. Another alternative is autothermal reforming, which has the added advantage of low utilities costs.

In an alternative embodiment, catalytic reforming may be employed instead of steam reforming. In a typical catalytic reforming zone, the reactions include dehydrogenation, dehydrocyclization, isomerization and hydrocracking. The dehydrogenation reactions typically will be the isomerization of alkylcyclopentanes to alkylcyclohexanes, the dehydrogenation of paraffins to olefins, the dehydrogenation of cyclohexanes to alkylcycloparaffins and the dehydrocyclization of acyclic paraffins and acyclic olefins to aromatics. The isomerization reactions included isomerization of n-paraffins to isoparaffins, the hydroisomerization of olefins to isoparaffins, and the isomerization of substituted aromatics. The hydrocracking reactions include the hydrocracking of paraffins. The aromatization of the n-paraffins to aromatics is generally considered to be highly desirable because of the high octane rating of the resulting aromatic product. In this application, the hydrogen generated by the reactions is also a highly desired product, for it is recycled to at least the deoxygenation zone. The hydrogen generated is recycled to any of the reaction zones, the hydrogenationideoxygenation zone, the isomerization zone, and or the selective hydrocracking zone. The aromatics and cycloparaffins that are generated would add to the gasoline fuel and or the aviation fuel depending upon boiling point. Addition of ring compounds to the SPK will result in increase density, which may be desirable.

Turning to the FIGURE, renewable feedstock 10 enters the reaction zone 12 along with make-up hydrogen stream 42 and optional hydrocarbon recycle 46. Contacting the non-petroleum feedstock with the multifunctional catalyst or set of catalysts generates hydrogenated, deoxygenated, selectively cracked and isomerized reaction zone effluent 14. Reaction zone effluent 14 is introduced into separator 16. Carbon oxides, possibly hydrogen sulfide and C3 and lighter components are separated and removed in line 22. Depending upon to whether the separator is operated in a hot or cold mode, the water may be removed as a vapor in line 22 (hot separator mode) or as a liquid in line 18 (cold separator mode). In hot separator mode, an additional stream (not shown) may be removed from 24 discussed below. The overhead in line 22 comprises a excess hydrogen not consumed in the reactions and the carbon dioxide from the decarboxylation reaction. The carbon dioxide can be removed from the excess hydrogen by means well known in the art, reaction with an aqueous inorganic alkaline solution, pressure swing absorption, etc. Also, absorption with an amine in processes such as described in co-pending applications U.S. application Ser. No. 12/193, 176 and U.S. application Ser. No. 12/193,196, hereby incorporated by reference, may be employed. If desired, essentially pure carbon dioxide can be recovered by regenerating the spent absorption media. Therefore line 22 is passed through a scrubber system 24 such as amine scrubbers to remove carbon dioxide in line 28 and hydrogen sulfide in line 26. Depending upon the scrubber technology selected some portion of water may also be retained by the scrubber. Hydrogen-rich gas is conducted via line 44 to ultimately combine with feedstock 10. A small purge of stream 44 may be included (not shown) to control recycle gas hydrogen purity.

A liquid stream containing jet fuel and diesel fuel range paraffins and some lighter hydrocarbons is removed from separator 16 in line 20 and conducted to product fractionation zone 30. Product fractionation zone 30 is operated so that product cut 34 contains the hydrocarbons in a boiling range most beneficial to meeting the desired aviation fuel specifications. Product cut 34 is collected for use as aviation fuel or as a blending component of aviation fuel. The lighter materials such as naphtha and LPG are removed in fractionation zone overhead stream 36. A portion of stream 36 may be conducted in line 38 to reforming zone 40, and hydrogen in line 42 may be recycled to combine with feedstock 10. Optionally, an external source of hydrocarbon feed may be introduced to reforming zone 40 (not shown). If desired, the naphtha and LPG may be further separated into an LPG stream and a naphtha stream (not shown).

Hydrocarbons that have a boiling point higher than acceptable for the specification of the aviation fuel are removed in bottoms stream 32. A portion of bottoms stream 32 may be recovered and used as fuel such as, for example, low sulfur heating oil fuel, ethylene plant feedstock, feed to lube plant, paraffinic solvent or dielectric oil. It is likely that bottoms stream 32 may be acceptable for use as diesel or a diesel blending component. A portion of bottoms stream 32 is recycled to the reaction zone. A portion of a hydrocarbon stream may also be cooled down if necessary and used as cool quench liquid between beds of the reaction zone to further control the heat of reaction and provide quench liquid for emergencies. The recycle stream may be introduced to the inlet of the reaction zone and/or to any subsequent beds or reactors. One benefit of the hydrocarbon recycle is to control the temperature rise across the individual beds. However, as discussed above, the amount of hydrocarbon recycle may be is determined based upon the desired hydrogen solubility in the reaction zone and to minimize the cracking severity per pass to result in high selectivity to aviation range paraffins. Increasing the hydrogen solubility in the reaction mixture allows for successful operation at lower pressures, and thus reduced cost. Operating with high recycle and maintaining high levels of hydrogen in the liquid phase helps dissipate hot spots at the catalyst surface and reduces the formation of undesirable heavy components which lead to coking and catalyst deactivation.

The following example is presented in illustration of this invention and is not intended as an undue limitation on the generally broad scope of the invention as set out in the appended claims.

EXAMPLE 1

Deoxygenation, hydrogenation, selective hydrocracking, and isomerization of refined-bleached-deodorized (RBD) soybean oil over several different multifunctional catalysts was accomplished by flowing the RBD soybean oil down over the catalyst in a tubular furnace at a controlled temperature, pressure, space velocity, and $H_2$/feed ratio. Each experiment was run at nearly complete deoxygenation and hydrogenation of the soybean oil with a portion of the n-paraffins selectively hydrocracked to produce jet range paraffins having approximately about 9 to about 18 carbon atoms. The deoxygenation products included CO, $CO_2$, $H_2O$, and propane; sulfur was removed as $H_2S$. Other side products of the selective hydrocracking function include gas phase light products and light liquid phase paraffins.

TABLE 1

| Catalyst | A | B | C |
|---|---|---|---|
| Temperature (C.) | 300 | 300 | 350 |
| Pressure (psig) | 800 | 500 | 500 |
| LHSV, h-1 | 0.3 | 0.9 | 0.9 |
| H2/feed (scf/bbl) | 9000 | 4000 | 4500 |
| Liquid yield | 91% | 90% | 71% |
| Jet range yield | 24% | 16% | 5% |
| iso/n jet range | 4.5 | 2.1 | 0.8 |

TABLE 1-continued

| Catalyst | A | B | C |
|---|---|---|---|
| product iso/n diesel range | 0.5 | 0.4 | 0.5 |
| Lights (liquid) | 17% | 6.2% | 0.4% |
| Lights (total) | 26% | 16% | 29% |
| % DeOx | 97% | 98% | 95% |

EXAMPLE 2

Deoxygenation, hydrogenation, selective hydrocracking, and isomerization of refined-bleached-deodorized (RBD) soybean oil over two different multifunctional catalysts in series was accomplished by flowing the RBD soybean oil down over two different catalysts in series (catalyst 1 and catalyst 2) in a tubular furnace at a controlled temperature, pressure, space velocity, and $H_2$/feed ratio. The experiment was run at nearly complete deoxygenation and hydrogenation of the soybean oil with a portion of the n-paraffins selectively hydrocracked to produce jet range paraffins having approximately about 9 to about 18 carbon atoms. The deoxygenation products included CO, $CO_2$, $H_2O$, and propane; sulfur was removed as $H_2S$. Other side products of the selective hydrocracking function include gas phase light products and light liquid phase paraffins. Table 2 summarizes reactor operating conditions and reactor effluent yields as wt.-% of soybean oil feedstock processed.

TABLE 2

| Temperature (° C.) | Cat. 1 332° C. |
|---|---|
|  | Cat. 2 398° C. |
| Pressure (kPag) | 5171 |
| LHSV ($h^{-1}$) | Cat. 1 0.5 |
|  | Cat. 2 1.0 |
| H2/feed (scf/bbl) | 5000 |
| H2O + CO2 | 13.7 wt.-% |
| C1 | 1.0 |
| C2 | 0.4 |
| C3 | 7.0 |
| iC4 | 2.0 |
| nC4 | 1.6 |
| Naphtha (nC5-132° C.) | 13.4 |
| Aviation (132° C.-279° C.) | 54.7 |
| Diesel (279° C.+) | 10 |

The invention claimed is:

1. A process for producing a hydrocarbon product stream from a renewable feedstock, the hydrocarbon product stream comprising hydrocarbons having boiling points in the aviation fuel range, said process comprising;
    a) hydrogenating, deoxygenating, isomerizing, and selectively hydrocracking the renewable feedstock in a reaction zone in the presence of hydrogen and at reaction conditions, by contacting the renewable feedstock with a multifunctional catalyst or a set of catalysts having hydrogenation, deoxygenation, isomerization, and selective hydrocracking functions to provide a reaction effluent comprising water, carbon oxides, light hydrocarbon gasses, hydrogen and paraffinic hydrocarbons wherein the deoxygenating comprises at least hydrodeoxygenation;
    b) separating the water, carbon oxides, light hydrocarbon gasses, and hydrogen from the reaction effluent to generate a stream comprising the paraffinic hydrocarbons;
    c) separating the stream comprising the paraffinic hydrocarbons to generate the hydrocarbon product comprising hydrocarbons having boiling points in the aviation fuel range; an overhead stream comprising naphtha; and a bottoms stream comprising components having boiling points higher than the aviation fuel boiling point range;

d) recycling a portion of the bottoms stream to the reaction zone wherein the volume ratio of recycle to feedstock is in the range of about 0.1:1 to about 8:1; and e) recovering the hydrocarbon product stream.

2. The process of claim 1 wherein the multifunctional catalyst or set of catalysts comprise components selected from the group consisting of noble metals, sulfided metals, sulfided base metals, zeolites, non-crystalline silica-aluminas, and aluminas.

3. The process of claim 1 wherein hydrocarbon product stream comprises paraffins having from about 6 to about 24 carbon atoms.

4. The process of claim 1 wherein the hydrocarbon product stream comprises paraffins having from about 8 to about 16 carbon atoms.

5. The process of claim 1 further comprising pre-treating the feedstock in a pretreatment zone at pretreatment conditions to remove at least a portion of contaminants in the feedstock.

6. The process of claim 1 where the pretreatment step comprises contacting the feedstock with an acidic ion exchange resin, an acid solution, or beaching earth material.

7. The process of claim 1 where deoxygenation further comprises at least one of decarboxylation, or decarbonylation.

8. The process of claim 1 wherein the renewable feedstock is in a mixture or co-feed with a petroleum hydrocarbon feedstock, and the petroleum hydrocarbon feedstock is co-processed with the renewable feedstock.

9. The process of claim 1 wherein the renewable feedstock comprises at least one component selected from the group consisting of canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, cottonseed oil, tallow, yellow and brown greases, lard, train oil, fats in milk, fish oil, algal oil, sewage sludge, cuphea oil, camelina oil, jatropha oil, curcas oil, babassu oil, palm oil, kernel oil, and crambe oil.

10. The process of claim 1 further comprising co-feeding or mixing with the renewable feedstock, a component selected from the group consisting of liquids derived from gasification of coal or natural gas followed by a downstream liquefaction; liquids derived from depolymerization, thermal or chemical, of waste plastics; and other synthetic oils generated as byproducts from petrochemical and chemical processes.

11. The process of claim 1 wherein the reaction zone effluent further comprises at least propane which is separated from the reaction zone effluent and conducted to a steam reforming zone to produce at least hydrogen, and said hydrogen being recycled to at least the reaction zone.

12. The process of claim 1 wherein the reaction zone effluent further provides paraffins having about 8 or less carbon atoms which are separated from paraffins having about 9 or more carbon atoms, the paraffins having about 8 or less carbon atoms being conducted to a steam reforming zone to produce at least hydrogen, said hydrogen being recycled to at least the reaction zone.

13. The process of claim 12 wherein the hydrocarbons having about 8 or less carbon atoms are separated into a vapor stream comprising paraffins having about 5 or fewer carbon atoms from a liquid stream comprising paraffins having about 6 or greater carbon atoms, with the vapor stream being cooled, condensed and conducted to the steam reforming zone.

14. The process of claim 13 wherein the liquid steam is collected as product or further refined.

15. The process of claim 1 further comprising mixing one or more additives to the hydrocarbon product stream.

* * * * *